UNITED STATES PATENT OFFICE.

JESSE F. NEWMAN, OF SHANGHAI, CHINA.

PROCESS FOR THE MANUFACTURE OF PARCHED-RICE BREAKFAST FOOD.

1,056,931.     Specification of Letters Patent.     Patented Mar. 25, 1913.

No Drawing.     Application filed September 3, 1912. Serial No. 718,289.

*To all whom it may concern:*

Be it known that I, JESSE F. NEWMAN, a citizen of the United States, whose residence and post-office address is No. 12 Wei Hai Wei road, Shanghai, China, have invented a new and useful Process for the Manufacture of Parched-Rice Breakfast Food, of which the following is a full and complete specification.

My invention relates to a new and useful process for preparing certain varieties of rice for use as a food.

Rice prepared as herein described is light, palatable and attractive. It may be placed in packages, sealed and kept for a very long period ready for immediate use at any time.

The only kinds of rice used and suitable for preparation by my process are the kinds known as tea rice and wine rice, so called because of the uses for which these kinds of rice are ordinarily put.

Under my process of preparation the rice must be thoroughly cleansed by washing and rubbing in water in order to remove all fine or broken particles of rice so that the grains will remain separate in the steaming process hereinafter described. After being washed in this manner the rice is to be placed in porcelain or earthenware jars, and allowed to soak for three days in pure water, the water being changed each day in order to avoid fermentation. Upon the completion of the above described process the rice is to be removed and placed in a steamer with fine mesh bottom that will prevent the rice from passing through into the kettle below,—and steamed over a broad mouthed kettle for two hours, then removed and spread on drying mats. The first drying must be done in the shade and the rice carefully stirred until all the grains have been carefully separated. After drying in this manner for six hours the rice is to be placed in the sun and sun-dried for about three days, or until thoroughly dried, when it can be placed in storage until such time as required for parching.

The parching pans are to be about half filled with very coarse sand or fine gravel about the size of No. 8 shot, and the sand heated over a slow fire for about fifteen minutes. A slight amount of wood oil is then to be added to the sand (about ½ oz.) and briskly stirred until thoroughly mixed with the sand. From two to three pounds of rice are then placed in the sand, and briskly stirred until all the rice is parched. The sand and rice are then removed from the fire and the sand sifted from the rice by means of a suitable sieve. Upon the completion of this process the sand is returned to the parching pans and the process repeated. After preparation in this manner the rice is ready for immediate use as a food or it may be sealed in packages and used at any later time without further preparation.

Having thus described my invention what I claim as new and desire to secure by Letters Patent is:

The process of preparing rice for food consisting of cleansing the rice by washing in water, soaking the rice in water placed in earthenware jars, changing water daily to prevent fermentation, then steaming the rice in kettle having a fine mesh bottom, then drying the rice about six hours in the shade, then thoroughly drying in the sunshine, then parching the rice by mixing it with preheated coarse sand or gravel to which has been added a small quantity of wood oil, and then by separating the rice and sand by means of a sieve all as described.

JESSE F. NEWMAN.

Witnesses:
MAHLON F. PERKINS,
W. HUTCHINSON.